Nov. 30, 1965  J. F. SCUDDER  3,220,326
INDICATING DEVICES FOR CAMERAS
Filed Jan. 13, 1964

JAMES F. SCUDDER
INVENTOR.

BY R. Frank Smith
Robert W. Hampton
ATTORNEYS

United States Patent Office 3,220,326
Patented Nov. 30, 1965

3,220,326
INDICATING DEVICES FOR CAMERAS
James F. Scudder, Rochester, N.Y., assignor to Eastman Kodak Company, Rochester, N.Y., a corporation of New Jersey
Filed Jan. 13, 1964, Ser. No. 337,224
6 Claims. (Cl. 95—10)

The present invention relates to battery powered photoelectric exposure control systems in cameras, and more particularly concerns battery testing or checking devices for such systems.

In battery powered photoelectric exposure control systems for cameras it is desirable to provide the camera user with convenient means to check the battery voltage so that he will not waste film by operating the camera when the battery voltage has decayed below that necessary for proper operation.

An object of the present invention is to provide an improved means for warning a camera operator of low voltage of a camera battery.

A related object is to use a single warning device to apprise the camera operator of either low scene brightness or low battery voltage.

Other objects of the invention will appear from the following description, reference being made to the accompanying drawings, wherein.

Figure 1:
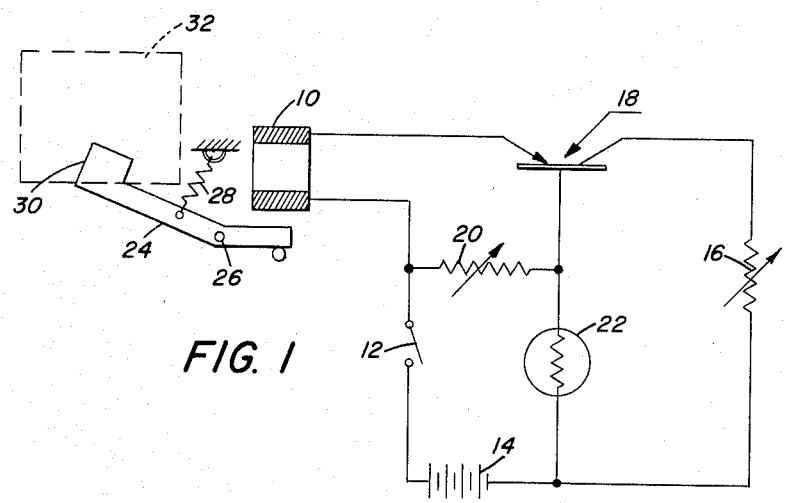
FIG. 1 is a schematic diagram of the control circuit and signal means.

Referring to FIG. 1 a relay or solenoid coil 10 is connected in series with a normally open switch 12, a battery 14, a first variable resistor 16 and the collector-emitter circuit of a transistor 18. The transistor base is connected to the emitter through a variable resistor 20 and to the collector through a photoresistive element, such as a photoconductive cell 22, and through resistor 16.

An armature 24 cooperates with relay coil 10 and is pivoted at 26. A flag 30 on armature 24 is visible in a viewfinder 32 when the armature is in its clockwise position, as shown in the drawing. A spring 28 maintains the armature in its clockwise position except when the relay receives more than a predetermined threshold current, in which case the relay operates as an electrical drive means for rocking the armature to its counterclockwise position, withdrawing flag 30 from the viewfinder.

Figure 2:
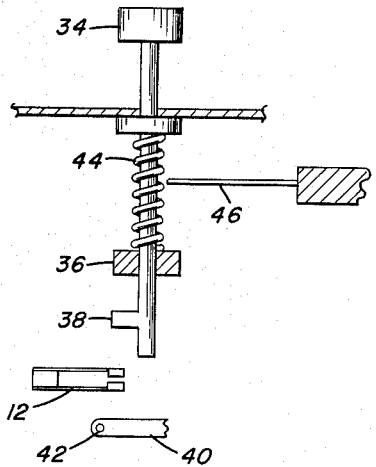
FIG. 2 is a side view, partly in section, of the camera actuating member and the devices controlled thereby.

A camera actuating member 34 (FIG. 2) is guided by fixed members such as 36 for vertical sliding movement. Actuating member 34 has an ear 38 cooperating with switch 12 for closing the latter in response to initial depression of member 34 against the tension of a first spring 44. Full depression of member 34 against the added tension of a second spring 46 actuates a shutter trigger 40, which is pivoted at 42. The provision of two springs 44 and 46 permits the camera operator to sense partial depression of member 34 for closing switch 12 without triggering the shutter.

Relay 10 and photocell 22 may be used to control an exposure regulating device in a manner well known in the art, for example as illustrated in Riszdorfer U.S. Patent No. 2,024,661, granted December 17, 1935

In the illustrated embodiment of the present invention, relay 10 is energized by battery 14 through the collector-emitter circuit of transistor 18 under control of the transistor base circuit. Resistor 20 and photocell 22 form a voltage divider for battery 14, so that the illumination of the photocell controls the voltage of the transistor base. When this voltage reaches a predetermined threshold level, the collector-emitter circuit supplies enough current to relay 10 so that the relay armature is rocked counterclockwise against the tension of spring 28 and flag 30 is withdrawn from the viewfinder. Because of the variability of resistor 20 the threshold level of the transistor base voltage is variably related to illumination of the photocell.

Initial depression of the camera actuating member 34 to close switch 12 closes the above-described voltage divider and relay circuits, and during normal camera operation the disappearance of flag 30 apprises the camera operator of the presence of sufficient scene brightness for normal photography. This occurs prior to full depression of member 34 for triggering the shutter and permits the camera operator to avoid wasting film on scenes that are too dark for normal photography.

According to the invention the same flag and its control system also are used to indicate low battery voltage. For this purpose the actuating member is depressed to close switch 12 without triggering the shutter, while the camera is aimed at a bright light, e.g., a close 100 watt lamp. If battery voltage is low the current supplied to relay 10 is insufficient to remove flag 30 from the viewfinder. The threshold battery voltage can be selected as that barely sufficient to energize a flash lamp, when the same battery is used also for that purpose. This voltage can be changed by varying resistor 16.

The invention has been described in detail with particular reference to a preferred embodiment thereof, but it will be understood that variations and modifications can be effected within the spirit and scope of the invention as described hereinabove and as defined in the appended claims.

I claim:

1. A test system for a battery, comprising in combination:
    a signalling device having first and second positions of operation and normally occupying said first position;
    electrical drive means energizable by said battery and effective, upon energization thereof above a predetermined level, for moving said signalling device to its second position;
    a variably conducting amplifier for controlling energization of said drive means in accordance with conduction by said amplifier; and
    photocell means controlling conduction of said amplifier for energizing said drive means above said level when and only when (1) said photocell is brightly illuminated and (2) the voltage output of said battery is above a predetermined level.

2. The test system defined in claim 1, wherein said amplifier comprises a transistor having an emitter, a collector and a base, said emitter being coupled to said base through said battery and said photocell and said collector being coupled to said base through said photocell.

3. The test system defined in claim 2, wherein one of said couplings includes a normally open switch.

4. The test system defined in claim 2, with a second coupling between said emitter and said base, said second coupling comprising a variable resistor.

5. The test system defined in claim 2, wherein said coupling between said emitter and base includes a variable resistor.

6. In a camera having a photoelectric exposure control system including a battery and a photocell, a battery test device, comprising: electrical drive means; a signalling member controlled by said drive means for assuming respective first and second positions when said drive means is energized above and below a predetermined threshold level; a variably conducting amplifier for controlling energization of said drive means in accordance with conduction by said amplifier; and means including said photocell and said battery for controlling conduction of said ampifier for energizing said drive means above said level when and only when (1) said photocell is brightly illuminated and (2) the voltage output of said battery is above a predetermined level.

References Cited by the Examiner

UNITED STATES PATENTS

| | | | |
|---|---|---|---|
| 3,021,771 | 2/1962 | Kirk | 95—64 |
| 3,124,048 | 3/1964 | Greger et al. | 95—10 |
| 3,151,535 | 10/1964 | Hahn | 95—10 |
| 3,164,075 | 1/1965 | Schulze | 95—10 |

FOREIGN PATENTS 1,235,184  5/1960  France.

OTHER REFERENCES

German application 1,056,470, April 1959.

EVON C. BLUNK, *Primary Examiner*.

NORTON ANSHER, *Examiner*.